(12) United States Patent
Williams

(10) Patent No.: US 9,715,163 B2
(45) Date of Patent: Jul. 25, 2017

(54) CASE SYSTEM

(71) Applicant: Eddie Williams, San Antonio, TX (US)

(72) Inventor: Eddie Williams, San Antonio, TX (US)

( * ) Notice: Subject to any disclaimer, the term of this patent is extended or adjusted under 35 U.S.C. 154(b) by 7 days.

(21) Appl. No.: 14/926,670

(22) Filed: Oct. 29, 2015

(65) Prior Publication Data
US 2017/0123295 A1 May 4, 2017

(51) Int. Cl.
| *H04N 5/225* | (2006.01) |
| *G03B 15/03* | (2006.01) |
| *H04N 5/235* | (2006.01) |
| *H04N 5/232* | (2006.01) |
| *G06F 1/18* | (2006.01) |

(52) U.S. Cl.
CPC ............. *G03B 15/03* (2013.01); *G06F 1/188* (2013.01); *H04N 5/2252* (2013.01); *H04N 5/2256* (2013.01); *H04N 5/2354* (2013.01); *H04N 5/23216* (2013.01)

(58) Field of Classification Search
CPC .. G03B 15/03; H04N 5/23216; H04N 5/2252; H04N 5/2354; H04N 5/2256; G06F 1/188
See application file for complete search history.

(56) References Cited

U.S. PATENT DOCUMENTS

| D504,768 | S | 5/2005 | Goradesky |
| D593,319 | S | 6/2009 | Richardson et al. |
| D594,224 | S | 6/2009 | Leung et al. |
| D667,823 | S | 9/2012 | Merenda |
| D674,748 | S | 1/2013 | Ferber et al. |
| D688,655 | S | 8/2013 | Rey-Hipolito |
| D710,343 | S | 8/2014 | Chandler, Jr. et al. |
| D711,312 | S | 8/2014 | Tien |
| D711,865 | S | 8/2014 | Smith |
| D714,275 | S | 9/2014 | Tompkin |
| D716,784 | S | 11/2014 | Wen |
| 2016/0112615 | A1* | 4/2016 | Consevage .......... H04N 5/2256 362/8 |

* cited by examiner

*Primary Examiner* — Padma Haliyur

(57) ABSTRACT

A case system includes an electronic device and the electronic device has a charge port. A case is provided and the electronic device is removably positioned in the case. The case is in electrical communication with the electronic device when the electronic device is positioned within the case. A pair of lights is provided and each of the lights is movably coupled to the case. Thus, each of the lights is positionable between a deployed position and a stored position. Each of the lights selectively emits light when the lights are positioned in the deployed position thereby facilitating the electronic device to take a picture. A charging unit is coupled to the case. The charging unit is in electrical communication with the electronic device when the electronic device is positioned within the case. Thus, the charging unit charges the electronic device.

12 Claims, 5 Drawing Sheets

CASE SYSTEM

BACKGROUND OF THE DISCLOSURE

Field of the Disclosure

The disclosure relates to case devices and more particularly pertains to a new case device for selectively emitting light to facilitate a camera to take a picture.

SUMMARY OF THE DISCLOSURE

An embodiment of the disclosure meets the needs presented above by generally comprising an electronic device and the electronic device has a charge port. A case is provided and the electronic device is removably positioned in the case. The case is in electrical communication with the electronic device when the electronic device is positioned within the case. A pair of lights is provided and each of the lights is movably coupled to the case. Thus, each of the lights is positionable between a deployed position and a stored position. Each of the lights selectively emits light when the lights are positioned in the deployed position thereby facilitating the electronic device to take a picture. A charging unit is coupled to the case. The charging unit is in electrical communication with the electronic device when the electronic device is positioned within the case. Thus, the charging unit charges the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
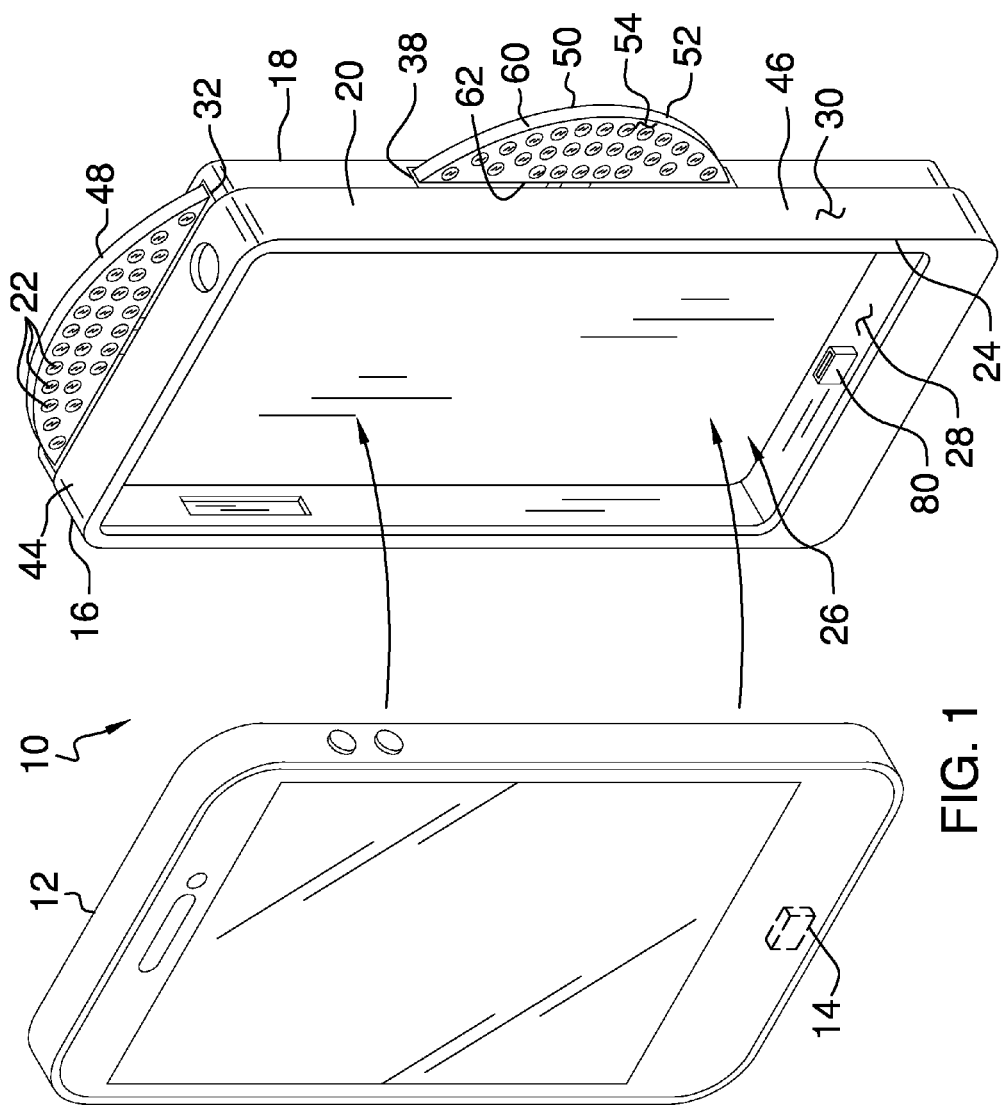
FIG. 1 is a front perspective view of a case system according to an embodiment of the disclosure.
Figure 2:
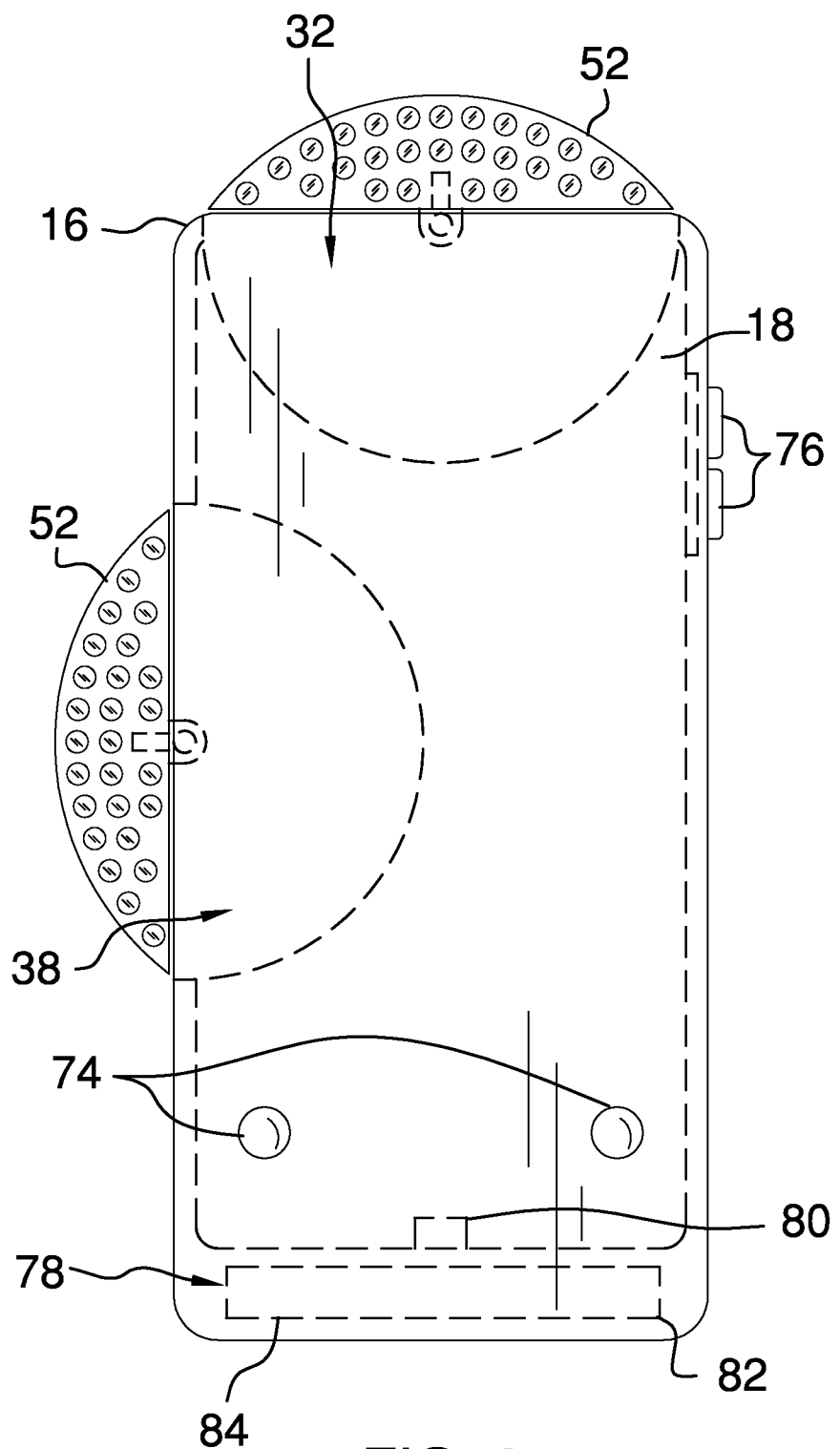
FIG. 2 is a back phantom view of an embodiment of the disclosure.
Figure 3:
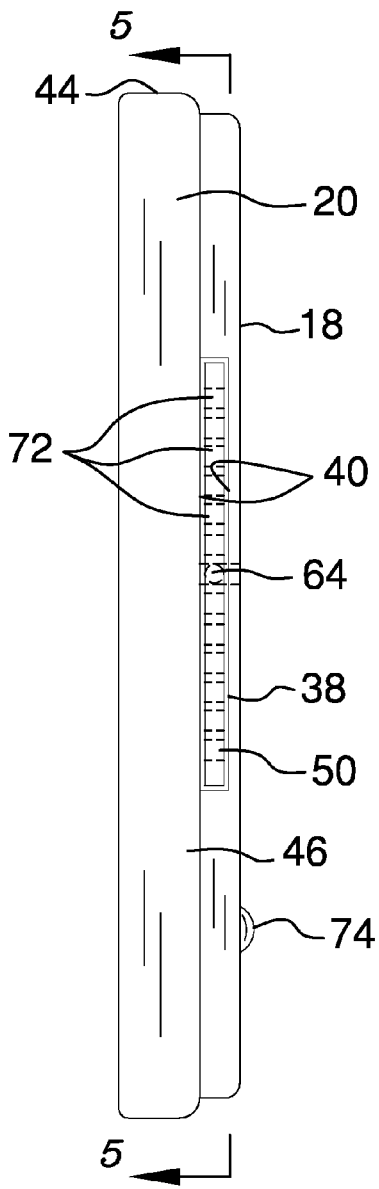
FIG. 3 is a right side view of an embodiment of the disclosure.
Figure 4:
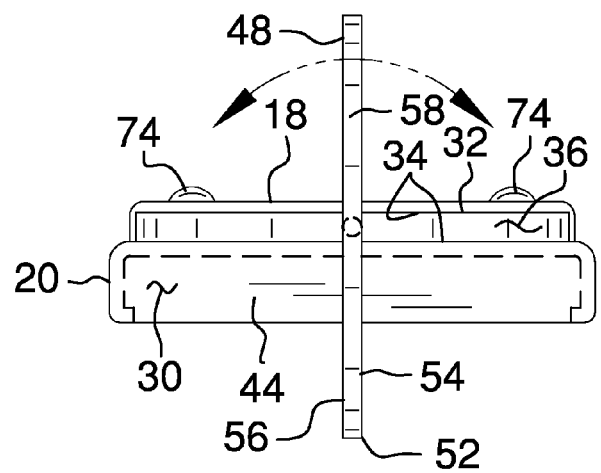
FIG. 4 is a top view of an embodiment of the disclosure.
Figure 5:
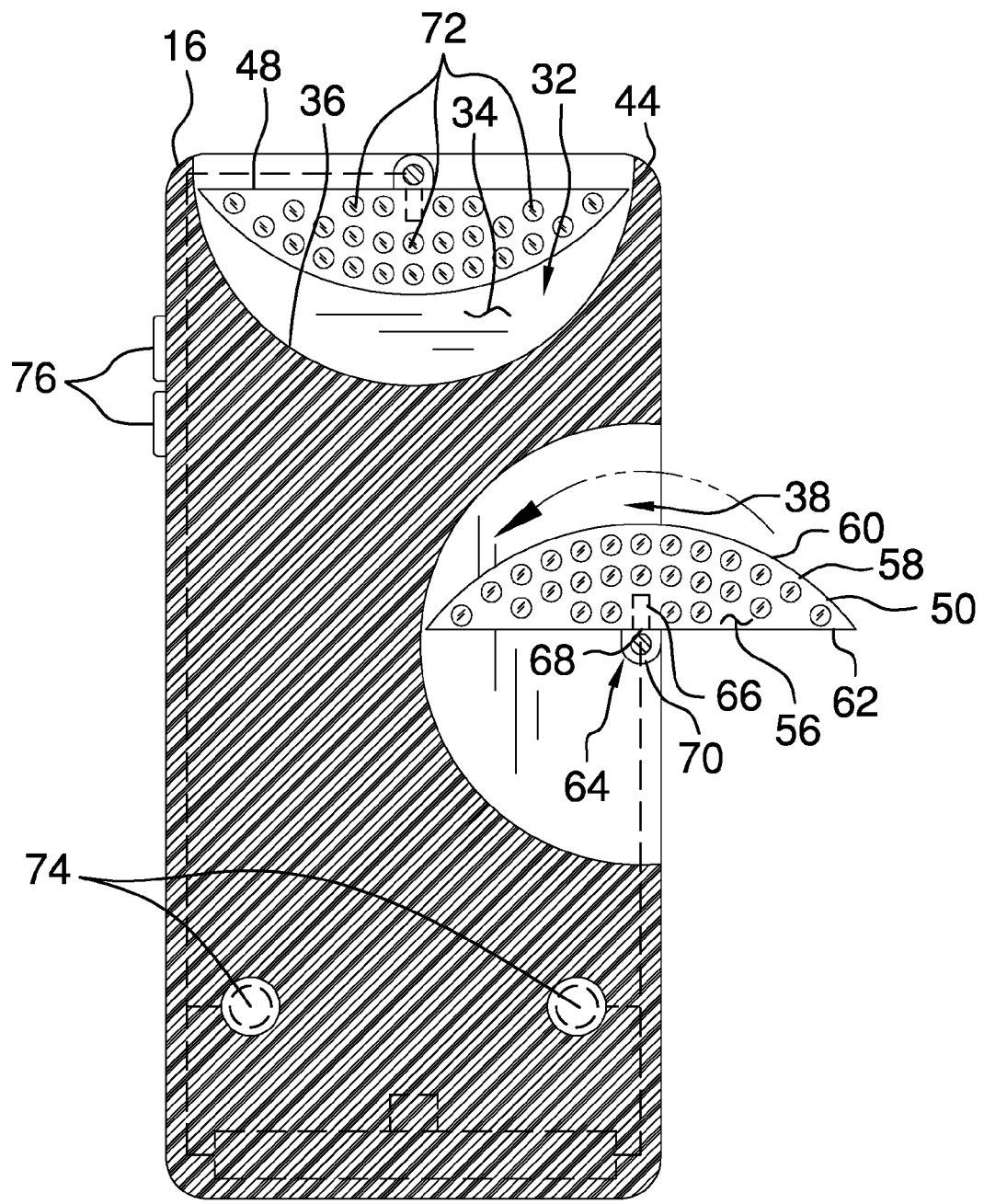
FIG. 5 is a cross sectional view taken along line 5-5 of FIG. 3 of an embodiment of the disclosure.
Figure 6:
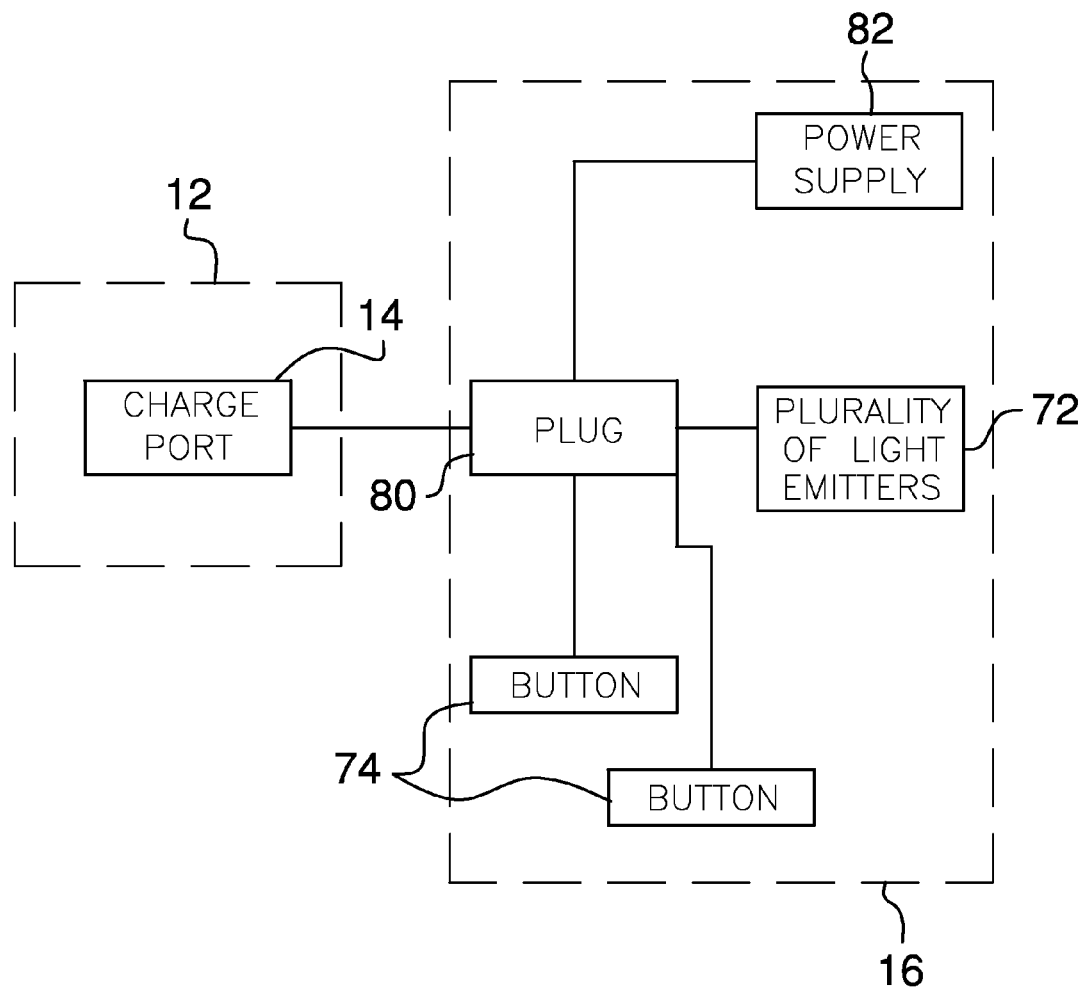
FIG. 6 is a schematic view of an embodiment of the disclosure.

With reference now to the drawings, and in particular to FIGS. 1 through 6 thereof, a new case device embodying the principles and concepts of an embodiment of the disclosure and generally designated by the reference numeral 10 will be described.

As best illustrated in FIGS. 1 through 6, the case system 10 generally comprises an electronic device 12 and the electronic device 12 has a charge port 14. A case 16 is provided and the electronic device 12 is removably positioned within the case 16. The case 16 is in electrical communication with the electronic device 12 when the electronic device 12 is positioned within the case 16. The electronic device 12 may comprise a smart phone or other electronic device capable of taking digital photos.

The case 16 has a back wall 18 and a peripheral wall that 20 is coupled to and extends away from the back wall 18. The peripheral wall 20 is coextensive with an outer edge 22 of the back wall 18. The peripheral wall 20 has a distal edge 24 with respect to the back wall 18 to define an opening 26 into the case 16. The peripheral wall 20 has an inner surface 28 and an outer surface 30. The electronic device 12 is inserted into the opening 26 such that the peripheral wall 20 frictionally engages the electronic device 12. Thus, the electronic device 12 is removably retained in the case 16.

The outer surface 30 has a first well 32 extending into the back wall 18 and the first well 32 has a pair of lateral bounding surfaces 34 and a lower bounding surface 36. The lower bounding surface 36 is curved such that the first well 32 has a semicircular shape. The outer surface 30 has a second well 38 extending into the back wall 18 and the second well has a pair of lateral bounding surfaces 40 and a lower bounding surface 42. The lower bounding surface 42 corresponding to the second well 38 is curved such that the second well 38 has a semi circular shape. The first well 32 may be positioned on a top side 44 of the peripheral wall 20 and the second well 38 may be positioned on a first lateral side 46 of the peripheral wall 20.

A first light 48 and a second light 50 are provided. Each of the first light 48 and the second light 50 is movably coupled to the case 16. Each of the first light 48 and the second light 50 is positionable between a deployed position and a stored position. Each of the first light 48 and the second light 50 may selectively emit light when the first light 48 and the second light 50 are positioned in the deployed position. Thus, the electronic device 12 may take a picture in a darkened environment.

Each of the first light 48 and the second light 50 comprise a wafer 52 that has a first surface 54, a second surface 56 and a perimeter edge 58 extending between the first surface 54 and the second surface 56. The perimeter edge 58 has a first side 60 and a second side 62. The second side 62 is flattened and the first side 60 is concavely arcuate with respect to the second side 62. Thus, the wafer 52 forms a segment of a circle.

A mount 64 is rotatably coupled to the wafer 52 and the mount 64 includes a shaft 66 extending into the second side 62. The shaft 66 is centrally positioned on the second side 62 and the shaft 66 has an exposed end 68 with respect to the wafer 52. The mount 64 includes a pivot 70 that is rotatably coupled to the exposed end 68. The pivot 70 corresponding to the first light 48 pivotally engages the first well 32. Thus, the wafer 52 corresponding to the first light 48 is rotatable about an axis extending through the distal edge 24 of the case 16 and the back wall 18 of the case 16. The pivot 70 corresponding to the second light 50 pivotally engages the second well 38. Thus, the wafer 52 corresponding to the second light 50 is rotatable about an axis extending through the distal edge 24 and the back wall 18.

The wafer 52 corresponding to each of the first light 48 and the second light 50 is rotated to extend outwardly from an associated one of the first well 32 and the second well 38 when the first light 48 and the second light 50 is positioned in the deployed position. The wafer 52 corresponding to each of the first light 48 and the second light 50 is rotated to be contained within an associated one of the first well 32 and the second well 38 when the first light 48 and the second light 50 are positioned in the stored position. The wafer 52 corresponding to the first light 48 is rotatable about an axis extending longitudinally through the shaft 66 corresponding to the first light 48 when the first light 48 is positioned in the deployed position. The wafer 52 corresponding to the second light 50 is rotatable about an axis extending longitudinally through the shaft 66 corresponding to the second light 50 when the second light 50 is positioned in the deployed position. Thus, each of the first light 48 and the second light 50 may emit the light in a selected direction.

A plurality of light emitters 72 is provided and each of the light emitters 72 is positioned within the wafer 52. Each of the light emitters 72 extends through the first surface 54 and the second surface 56. Thus, each of the light emitters 72 may emit light outwardly from the first surface 54 and the second surface 56. The light emitters 72 are spaced apart from each other and are distributed on the wafer 52. Each of the light emitters 72 is in electrical communication with the electronic device 12 when the electronic device 12 is positioned within the case 16. Each of the light emitters 72 may comprise an LED or the like.

A pair of buttons 74 is provided. Each of the buttons 74 is positioned on the back wall 18 and each of the buttons 74 may be manipulated. Each of the buttons 74 is electrically coupled to the light emitters 72. Thus, the buttons 74 actuate the light emitters 72 between a minimum brightness and a maximum brightness.

A pair of volume buttons 76 is provided and each of the volume buttons 76 is movably coupled to the case 16. Each of the volume buttons 76 may be manipulated. Each of the volume buttons 76 engages the electronic device 12 when the volume buttons 76 are manipulated. Thus, each of the volume buttons 76 adjusts a volume of the electronic device 12.

A charging unit 78 is coupled to the case 16. The charging unit 78 is in electrical communication with the electronic device 12 when the electronic device 12 is positioned within the case 16. Thus, the charging unit 78 charges the electronic device 12. The charging unit 78 comprises a plug 80 that is positioned on the inner surface 28 of the peripheral wall 20. The plug 80 is electrically coupled to the charge port 14 when the electronic device 12 is positioned within the case 16. The plug 80 is electrically coupled to each of the light emitters 72.

A power supply 82 is positioned within the case 16. The power supply 82 is electrically coupled to the plug 80. The power supply 82 maintains a charge of the electronic device 12 when the electronic device 12 is positioned within the case 16. The power supply 82 comprises at least one rechargeable battery 84.

In use, the electronic device 12 is positioned within the case 16 such that the plug 80 engages the charge port 14. Each of the first light 48 and the second light 50 are positioned in the deployed position when the electronic device 12 takes a picture. The light emitters 72 are turned on when a camera function of the electronic device 12 is actuated. Each of the first light 48 and the second light 50 are manipulated to direct the light in a selected direction. Thus, the first light 48 and the second light 50 enhance lighting for the picture. The first light 48 and the second light 50 may be positioned in the deployed position in tandem or individually.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A case system having an integrated light emitter, said system comprising:
    an electronic device, said electronic device having a charge port;
    a case having said electronic device being removably positioned therein, said case being in electrical communication with said electronic device when said electronic device is positioned within said case;
    a pair of lights, each of said lights being movably coupled to said case such that each of said lights is positionable between a deployed position and a stored position, each of said lights being configured to selectively emit light when said lights are positioned in said deployed position thereby facilitating said electronic device to take a picture, wherein said pair of lights comprises a first light and a second light, each of said first light and said second light comprising a wafer having a first surface, a second surface and a perimeter edge extending between said first surface and said second surface, said perimeter edge having a first side and a second side, said second side being flattened, said first side being concavely arcuate with respect to said second side such that said wafer forms a segment of a circle; and
    a charging unit being coupled to said case, said charging unit being in electrical communication with said electronic device when said electronic device is positioned within said case such that said charging unit charges said electronic device.

2. The system according to claim 1, wherein said case has a back wall and a peripheral wall being coupled to and extending away from said back wall, said peripheral wall being coextensive with an outer edge of said back wall, said peripheral wall having a distal edge with respect to said back wall to define an opening into said case, said peripheral wall having an inner surface and an outer surface, said electronic device being inserted into said opening such that said peripheral wall frictionally engages said electronic device thereby removably retaining said electronic device in said case.

3. A case system having an integrated light emitter, said system comprising:
    an electronic device, said electronic device having a charge port;

a case having said electronic device being removably positioned therein, said case being in electrical communication with said electronic device when said electronic device is positioned within said case;

a pair of lights, each of said lights being movably coupled to said case such that each of said lights is positionable between a deployed position and a stored position, each of said lights being configured to selectively emit light when said lights are positioned in said deployed position thereby facilitating said electronic device to take a picture;

a charging unit being coupled to said case, said charging unit being in electrical communication with said electronic device when said electronic device is positioned within said case such that said charging unit charges said electronic device;

wherein said case has a back wall and a peripheral wall being coupled to and extending away from said back wall, said peripheral wall being coextensive with an outer edge of said back wall, said peripheral wall having a distal edge with respect to said back wall to define an opening into said case, said peripheral wall having an inner surface and an outer surface, said electronic device being inserted into said opening such that said peripheral wall frictionally engages said electronic device thereby removably retaining said electronic device in said case;

wherein said outer surface has a first well extending into said back wall, said first well having a bounding surface, said bounding surface being curved such that said first well has a semicircular shape; and wherein said outer surface has a second well extending into said back wall, said second well having a bounding surface, said bounding surface corresponding to said second well being curved such that said second well has a semi circular shape.

4. The system according to claim 1, further comprising:
a mount being rotatably coupled to said wafer, said mount including a shaft extending into said second side, said shaft being centrally positioned on said second side, said shaft having an exposed end with respect to said wafer; and
said mount including a pivot being rotatably coupled to said exposed end.

5. The system according to claim 4, wherein:
said case has a first well, a second well, a distal edge and a back wall; and
said pivot corresponding to said first light pivotally engaging said first well such that said wafer corresponding to said first light is rotatable about an axis extending through said distal edge of said case and said back wall of said case, said pivot corresponding to said second light pivotally engaging said second well such that said wafer corresponding to said second light is rotatable about an axis extending through said distal edge and said back wall.

6. The system according to claim 5, wherein said wafer corresponding to each of said first light and said second light are rotated to extend outwardly from an associated one of said first well and said second well when said first light and said second light is positioned in said deployed position, said wafer corresponding to each of said first light and said second light being rotated to be contained within an associated one of said first well and said second well when said first light and said second light is positioned in said stored position.

7. The system according to claim 5, wherein:
said wafer corresponding to said first light is rotatable about an axis extending longitudinally through said shaft corresponding to said first light when said first light is positioned in said deployed position wherein said first light is configured to emit the light in a selected direction; and
said wafer corresponding to said second light being rotatable about an axis extending longitudinally through said shaft corresponding to said second light when said second light is positioned in said deployed position wherein said second light is configured to emit the light in a selected direction.

8. The system according to claim 1, further comprising a plurality of light emitters, each of said light emitters being positioned within said wafer, each of said light emitters extending through said first surface and said second surface wherein each of said light emitters is configured to emit light outwardly from said first surface and said second surface, said light emitters being spaced apart from each other and distributed on said wafer, each of said light emitters being in electrical communication with said electronic device when said electronic device is positioned within said case.

9. The system according to claim 8, further comprising:
said case having a back wall; and
a pair of buttons, each of said buttons being positioned on said back wall wherein each of said buttons is configured to be manipulated, each of said buttons being electrically coupled to said light emitters such that said buttons actuate said light emitters between a minimum brightness and a maximum brightness.

10. The system according to claim 1, wherein:
said case has a peripheral wall, said peripheral wall having an inner surface;
a plurality of light emitters; and
said charging unit comprises a plug being positioned on said inner surface of said peripheral wall such that charge port is electrically coupled to said charge port when said electronic device is positioned within said case, said plug being electrically coupled to each of said light emitters.

11. The system according to claim 10, further comprising a power supply being positioned within said case, said power supply being electrically coupled to said plug such that said power supply maintains a charge of said electronic device when said electronic device is positioned within said case, said power supply comprising at least one rechargeable battery.

12. A case system having an integrated light emitter, said system comprising:
an electronic device, said electronic device having a charge port;
a case having said electronic device being removably positioned therein, said case being in electrical communication with said electronic device when said electronic device is positioned within said case, said case having a back wall and a peripheral wall being coupled to and extending away from said back wall, said peripheral wall being coextensive with an outer edge of said back wall, said peripheral wall having a distal edge with respect to said back wall to define an opening into said case, said peripheral wall having an inner surface and an outer surface, said electronic device being inserted into said opening such that said peripheral wall frictionally engages said electronic device thereby removably retaining said electronic device in said case, said outer surface having a first well extending into said back wall, said first well having a bounding surface, said bounding surface being curved such that said first well has a semicircular shape, said outer surface having a second well extending into said back wall, said second well having a bounding surface, said bounding surface corresponding to said second well being curved such that said second well has a semi circular shape;

a pair of lights, each of said lights being movably coupled to said case such that each of said lights is positionable between a deployed position and a stored position, each of said lights being configured to selectively emit light when said lights are positioned in said deployed position thereby facilitating said electronic device to take a picture, said pair of lights comprising a first light and a second light, each of said first light and said second light comprising:

a wafer having a first surface, a second surface and a perimeter edge extending between said first surface and said second surface, said perimeter edge having a first side and a second side, said second side being flattened, said first side being concavely arcuate with respect to said second side such that said wafer forms a segment of a circle, a mount being rotatably coupled to said wafer, said mount including a shaft extending into said second side, said shaft being centrally positioned on said second side, said shaft having an exposed end with respect to said wafer, said mount including a pivot being rotatably coupled to said exposed end, said pivot corresponding to said first light pivotally engaging said first well such that said wafer corresponding to said first light is rotatable about an axis extending through said distal edge of said case and said back wall of said case, said pivot corresponding to said second light pivotally engaging said second well such that said wafer corresponding to said second light is rotatable about an axis extending through said distal edge and said back wall, said wafer corresponding to each of said first light and said second light being rotated to extend outwardly from an associated one of said first well and said second well when said first light and said second light is positioned in said deployed position, said wafer corresponding to each of said first light and said second light being rotated to be contained within an associated one of said first well and said second well when said first light and said second light is positioned in said stored position, said wafer corresponding to said first light being rotatable about an axis extending longitudinally through said shaft corresponding to said first light when said first light is positioned in said deployed position wherein said first light is configured to emit the light in a selected direction, said wafer corresponding to said second light being rotatable about an axis extending longitudinally through said shaft corresponding to said second light when said second light is positioned in said deployed position wherein said second light is configured to emit the light in a selected direction, a plurality of light emitters, each of said light emitters being positioned within said wafer, each of said light emitters extending through said first surface and said second surface wherein each of said light emitters is configured to emit light outwardly from said first surface and said second surface, said light emitters being spaced apart from each other and distributed on said wafer, each of said light emitters being in electrical communication with said electronic device when said electronic device is positioned within said case, and a pair of buttons, each of said buttons being positioned on said back wall wherein each of said buttons is configured to be manipulated, each of said buttons being electrically coupled to said light emitters such that said buttons actuate said light emitters between a minimum brightness and a maximum brightness;

a charging unit being coupled to said case, said charging unit being in electrical communication with said electronic device when said electronic device is positioned within said case such that said charging unit charges said electronic device, said charging unit comprising:

a plug being positioned on said inner surface of said peripheral wall such that plug is electrically coupled to said charge port when said electronic device is positioned within said case, said plug being electrically coupled to each of said light emitters, and a power supply being positioned within said case, said power supply being electrically coupled to said plug such that said power supply maintains a charge of said electronic device when said electronic device is positioned within said case, said power supply comprising at least one rechargeable battery.

* * * * *